(12) United States Patent
Shinoda et al.

(10) Patent No.: US 8,849,024 B2
(45) Date of Patent: Sep. 30, 2014

(54) IMAGE PROCESSING DEVICE AND MEDIUM STORING IMAGE PROCESSING PROGRAM

(75) Inventors: Tomotaka Shinoda, Kita-ku (JP); Toshihiro Mitaka, Sapporo (JP); Hideki Ito, Sapporo (JP); Satoshi Mori, Sapporo (JP); Sato Tsutomu, Sapporo (JP); Satoshi Iyama, Sapporo (JP)

(73) Assignee: Nikon Corporation, Tokyo (JP)

( * ) Notice: Subject to any disclaimer, the term of this patent is extended or adjusted under 35 U.S.C. 154(b) by 477 days.

(21) Appl. No.: 12/566,225

(22) Filed: Sep. 24, 2009

(65) Prior Publication Data

US 2010/0074508 A1    Mar. 25, 2010

(30) Foreign Application Priority Data

Sep. 25, 2008 (JP) ................................. 2008-246010

(51) Int. Cl.
*G06K 9/00* (2006.01)
*G06K 9/40* (2006.01)
*G06K 9/46* (2006.01)

(52) U.S. Cl.
CPC ............ *G06K 9/0014* (2013.01); *G06K 9/4652* (2013.01)
USPC ........... 382/167; 382/128; 382/133; 382/134; 382/162; 382/274

(58) Field of Classification Search
CPC .................................................. H04N 1/6075
USPC ......................................... 382/162, 163, 167
See application file for complete search history.

(56) References Cited

U.S. PATENT DOCUMENTS

| 5,130,935 A | 7/1992 | Takiguchi |
| 6,404,916 B1 | 6/2002 | De La Torre-Bueno |
| 2004/0165772 A1* | 8/2004 | Russell et al. ................ 382/167 |

(Continued)

FOREIGN PATENT DOCUMENTS

| JP | 62-092074 A | 4/1987 |
| JP | 62-261062 A | 12/1987 |

(Continued)

OTHER PUBLICATIONS

Thil, "Create the Pleasantville Effect in Avid Liquid," Jul. 2006.*

(Continued)

*Primary Examiner* — Anand Bhatnagar
*Assistant Examiner* — Soo Park
(74) *Attorney, Agent, or Firm* — Arent Fox LLP

(57) ABSTRACT

An image processing device can explicitly distinguish cells to be observed from cells other than those to be observed with a simple configuration. To this end, the image processing device includes a color information obtaining part obtaining at least hue from color information of each pixel of a color image, a detecting part detecting a mode value of the hue on a color space, a range setting part setting a predetermined range on the color space including the mode value of the hue detected by the detecting part as a target range, a changing part changing hue of a pixel included in the target range by virtually performing extension on the target range, and an information converting part converting color information of a pixel having hue not included in the target range into color information indicative of an achromatic color.

8 Claims, 8 Drawing Sheets

(56) References Cited

U.S. PATENT DOCUMENTS

| | | | |
|---|---|---|---|
| 2005/0271267 A1* | 12/2005 | Cooper et al. | 382/162 |
| 2007/0296986 A1* | 12/2007 | Watanabe et al. | 358/1.9 |
| 2008/0069439 A1* | 3/2008 | Kwak et al. | 382/162 |
| 2009/0110273 A1 | 4/2009 | Shinoda et al. | |

FOREIGN PATENT DOCUMENTS

| | | |
|---|---|---|
| JP | 01-138877 A | 5/1989 |
| JP | 2003-506796 A | 2/2003 |
| JP | 2008-20949 A | 1/2008 |

OTHER PUBLICATIONS

B. Swolin et al., "Differential counting of blood leukocytes using automated microscopy and a decision support system based on artificial neural networks—evaluation of DiffMaster Octavia", Clinical & Laboratory Haemotology, 2003, pp. 139-147, vol. 25, Blackwell Publishing, Sweden.

Japanese Office Action dated Jun. 11, 2013, 5 pages (partial translation).

\* cited by examiner

IMAGE PROCESSING DEVICE AND MEDIUM STORING IMAGE PROCESSING PROGRAM

CROSS REFERENCE TO THE RELATED APPLICATIONS

This application is based upon and claims the benefit of priority from Japanese Patent Application No. 2008-246010, filed on Sep. 25, 2008, the entire contents of which are incorporated herein by reference.

BACKGROUND

1. Field

The present application relates to an image processing device and an image processing program that process a color image.

2. Description of the Related Art

In order to accurately diagnose various diseases of animals including humans, diagnoses of pathological tissues and cells are indispensable. Among others, information about kinds, numbers and shapes of cells included in blood and bone marrow is indispensable in many diagnoses of diseases, and therefore, cells are collected from blood and bone marrow and specimens are prepared and then a technical expert observes differences in shapes and color tones of the cells using a microscope and judges the kinds and abnormalities of individual cells. Such tasks (in which a technical expert directly looks into a microscope and makes a judgment manually based on his/her own experience) are carried out routinely in an inspection room of hospitals all over the world.

On the other hand, with the recent development of digital technologies, each element of a microscopic image is converted into a digital element and an image can be not only directly projected on a screen but also processed in a variety of ways using software. If the task of judgment based on the experience of a technical expert is generalized into a method by which any one can make a distinction, it is made possible to considerably reduce the time and costs for the task.

In such circumstances, a color image of a stained specimen is taken in and pathological diagnoses of the specimen are made based on the image. It is common to identify the kinds of individual cells based on the differences in forms of specimen images that appear in the image (for example, refer to Non-patent document 1: Clinical & Laboratory Haematology, 2003, vol. 25, pp. 139-147, "Differential counting of blood leukocytes using automated microscopy and a decision support system based on artificial neural networks-evaluation of DiffMaster Octavia"). Instead of the diagnosis based on the differences in forms of specimen images, it is also proposed to identify the kinds of individual cells by plotting the values of each pixel of a color image of specimen in a predetermined color space and distinguishing between color differences for each kind of cells based on the sub-volume occupied by the values of each pixel in the color space (for example, refer to Patent document 1: Japanese Unexamined Patent Application Publication No. 2003-506796).

The method for distinguishing color differences for each kind of cells based on the sub-volume in the color space, is however an indirect method. In recent years, it is desired to directly distinguish between color differences for each kind of cells in a color image (real image) of specimen and make a diagnosis based on the color difference. However, the color difference for each kind of cells in a real image is extremely slight, and therefore, when a mixture of cells to be observed and cells other than those to be observed exists, there is a problem that it is difficult to distinguish the cells to be observed from cells other than those to be observed from the real image.

SUMMARY

A proposition of the present embodiments is to provide an image processing device and a medium that stores an image processing program capable of explicitly distinguishing the cells to be observed from cells other than those to be observed.

In order to solve the above problems, an image processing device includes a color information obtaining part that obtains at least hue from color information of each pixel of a color image, a detecting part that detects a mode value of the hue on a color space, a range setting part that sets a predetermined range on the color space including the mode value of the hue detected by the detecting part as a target range, a changing part that changes hue of a pixel included in the target range by virtually performing extension on the target range, and an information converting part that converts color information of a pixel having hue not included in the target range into color information indicative of an achromatic color.

According to another aspect of the present embodiments, an image processing device includes a color information obtaining part that obtains at least hue from color information of each pixel of a color image, a detecting part that detects a mode value of the hue on a color space, a range setting part that sets a predetermined range on the color space including the mode value of the hue detected by the detecting part as a target range, a changing part that changes hue of a pixel included in the target range by virtually performing extension on the target range, and an information converting part that converts color information of a pixel having hue not included in the target range into color information of a single hue different from the hue to be changed by the changing part.

The changing part extends the target range while avoiding all hue on the color space from being included in the target range after the extension.

The range setting part sets a range within predetermined angles with respect to a straight line that connects a center of a plane and the mode value of the hue as the target range.

The color information obtaining part finds saturation of each pixel of the color image in addition to the hue and the detecting part finds the mode value of the hue by developing the hue and the saturation of each pixel of the color image on the plane represented by the hue and the saturation.

The range setting part sets a predetermined range in a hue direction with respect to the straight line that connects the center of the plane and the mode value of the hue as the target range.

The changing part changes the hue included in the target range by performing extension on the target range in the hue direction based on the straight line that connects the center of the plane and the mode value of the hue.

The changing part changes the saturation as well as changing the hue included in the target range.

According to another aspect of the present embodiments, a computer-readable medium storing an image processing program causes a computer to execute a color information obtaining operation of obtaining at least hue from color information of each pixel of a color image, a detecting operation of detecting a mode value of the hue on a color space, a range setting operation of setting a predetermined range on the color space including the mode value of the hue detected in the detecting operation as a target range, a changing operation of changing hue of a pixel included in the target range by virtually performing extension of the target range, and an information converting operation of converting color information of a pixel having hue not included in the target range into color information indicative of an achromatic color.

According to another aspect of the present embodiments, a computer-readable medium storing an image processing program causes a computer to execute a color information obtaining operation of obtaining at least hue from color information of each pixel of a color image, a detecting operation of detecting a mode value of the hue on a color space, a range setting operation of setting a predetermined range on the color space including the mode value of the hue detected in the detecting operation as a target range, a changing operation of changing hue of a pixel included in the target range by virtually performing extension on the target range, and an information converting operation of converting color information of a pixel having hue not included in the target range into color information of a single hue different from the hue to be changed in the changing operation.

According to the present application, it is possible to make larger hue difference of the hue to be changed by performing extension on the target range, and therefore, it is made possible to easily distinguish between slight differences in stained cells etc. Further, the color information of the pixel having the hue not included in the target range is converted into the color information indicative of the achromatic color or the color information of the single hue, and therefore, it is possible to explicitly distinguish the cells to be observed from cells other than those to be observed and to make an observation while focusing on the cells to be observed.

DETAILED DESCRIPTION OF THE EMBODIMENTS

Figure 1:
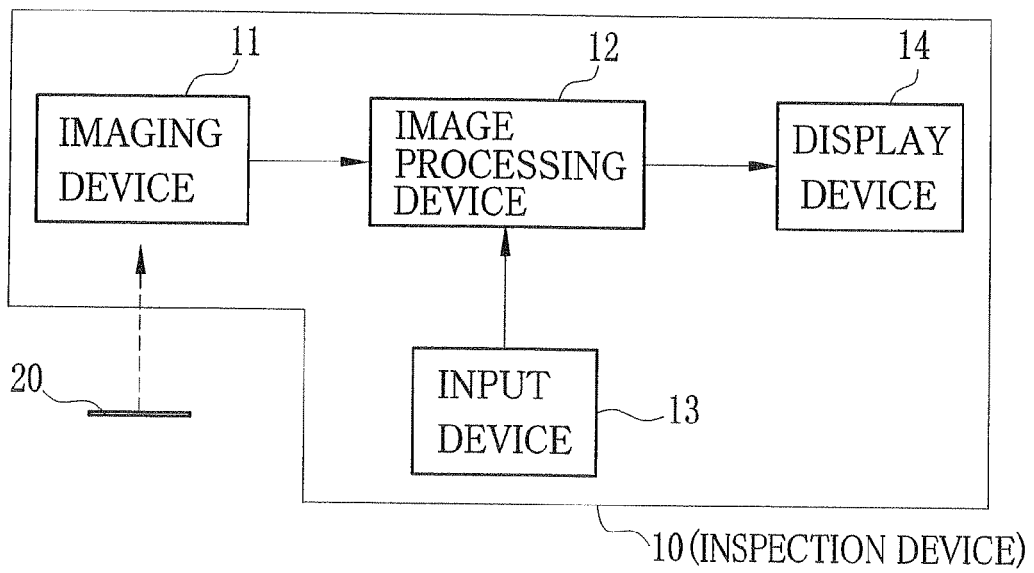
FIG. 1 is a block diagram showing an outline of a configuration of an inspection device.
Figure 2:
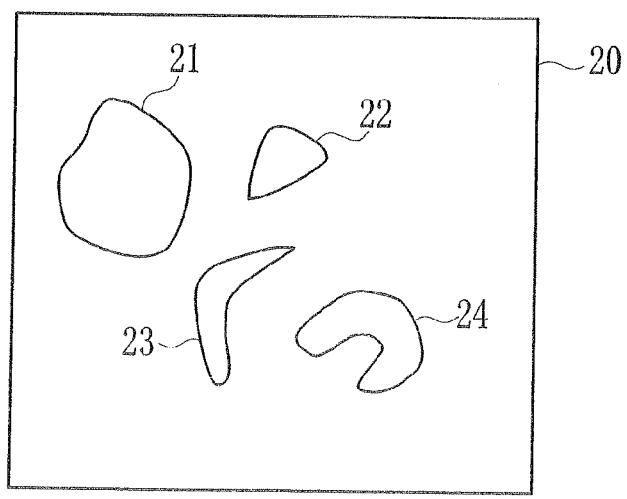
FIG. 2 is an explanatory diagram showing an example of a color image of specimen.

FIG. 1 is a functional block diagram showing a configuration of an inspection device 10. The inspection device 10 is used for pathological diagnosis of a specimen 20. The specimen 20 includes a plurality of cells 21 to 24, as shown in FIG. 2. The inspection device 10 is provided with an imaging device 11, such as a digital camera, an image processing device 12, an input device 13, and a display device 14. In the inspection device 10, the imaging device 11 photographs the specimen 20 and outputs a color image (RGB image) of the specimen 20 to the image processing device 12.

The image processing device 12 takes in the color image of the specimen 20 and processes the color image. In processing, a user instruction from the input device 13 is referred to as the need arises. In addition, the color image during or after processing is output to the display device 14 if necessary.

The image processing device 12 includes, for example, a computer in which an image processing program is installed. In the image processing device 12, the following processing (processing shown in FIG. 3) is executed.

Figure 3:
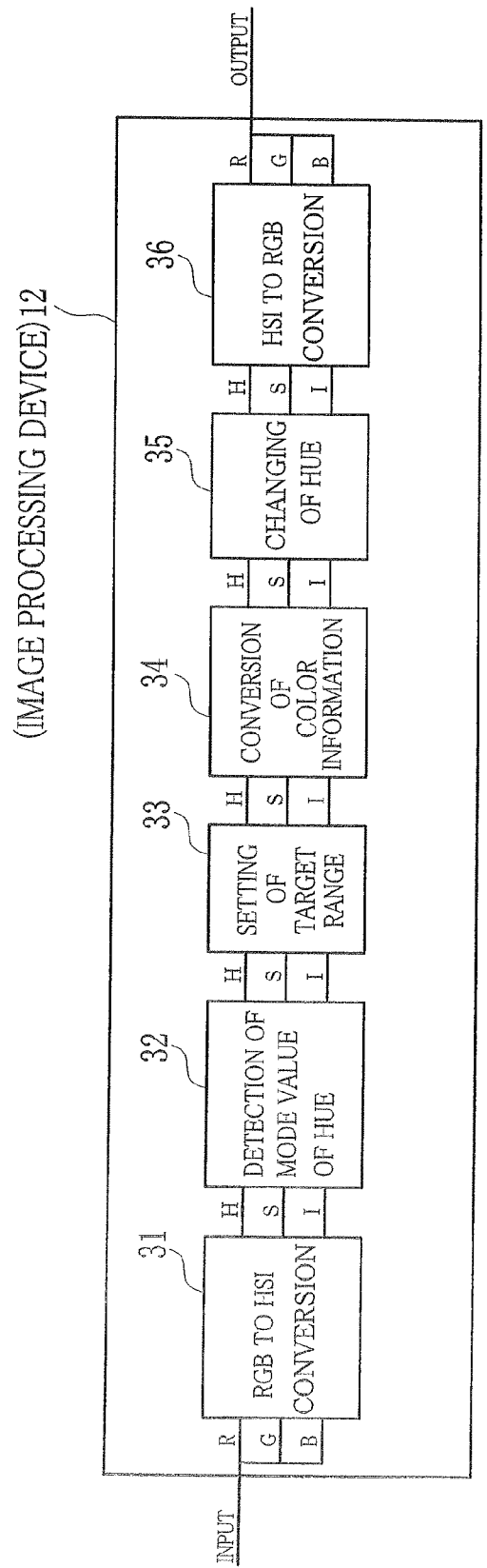
FIG. 3 is a diagram showing an example of a data path when processing a color image.

1) RGB to HSI conversion processing (block 31 in FIG. 3)
2) Detection processing of mode value of hue (block 32 in FIG. 3)
3) Setting processing of target range (block 33 in FIG. 3)
4) Conversion processing of color information (block 34 in FIG. 3)
5) Changing processing of hue (block 35 in FIG. 3)
6) HSI to RGB conversion processing (block 36 in FIG. 3)

An image to be processed in the image processing device 12 includes a color image (RGB image) of the specimen 20.

1) RGB to HSI Conversion Processing

The RGB to HSI conversion processing converts color information including the component values of each color of red, green and blue (R, G, B) of a color image into color information of hue (H), saturation (S) and intensity (I). In the present embodiment, color information including the component values of each color of RGB is converted into color information including the component values of hue, saturation and intensity, however, this does not need to be limited, but for example, it may be converted into color information including brightness and color differences of YCbCr etc.

2) Detection Processing of Mode Value of Hue

Figure 4:
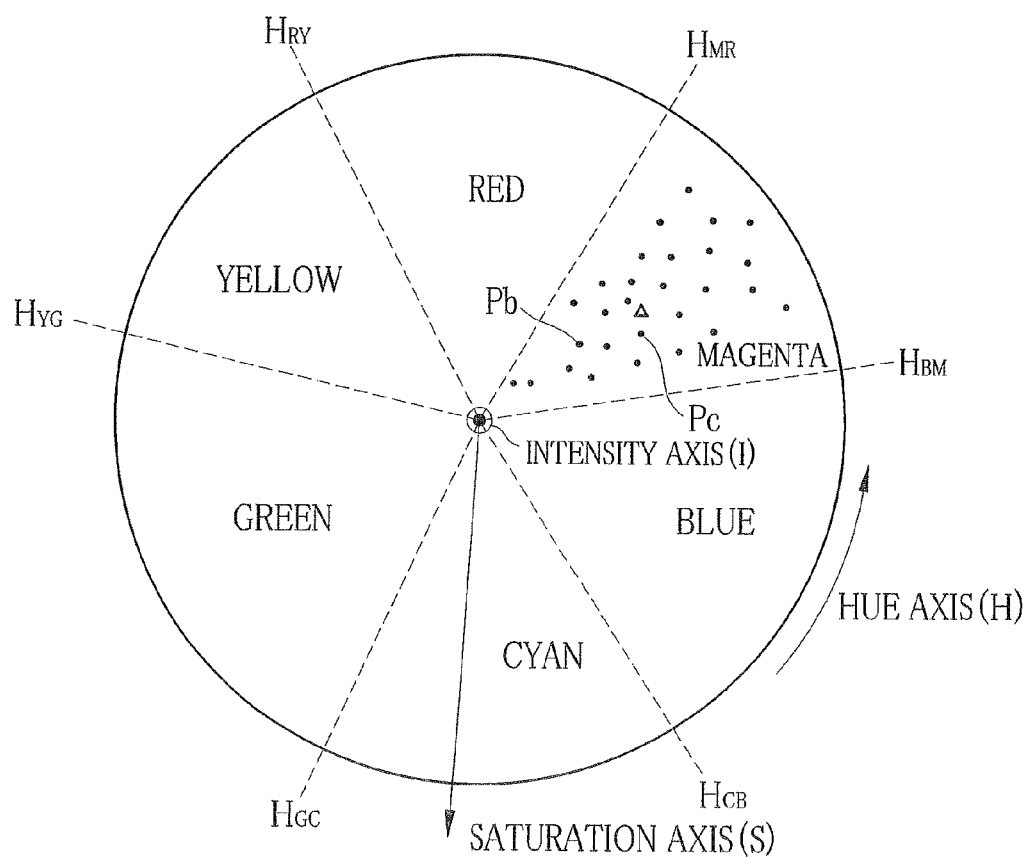
FIG. 4 is an explanatory diagram in which the values (hue/saturation/intensity) of each pixel after HSI conversion are plotted in a predetermined color space.

Using the color information of each pixel converted by the RGB to HSI conversion processing, each pixel is plotted in a predetermined color space. By the above-mentioned conversion processing, the color information of each pixel is converted into color information of hue, saturation and intensity, and therefore, each pixel is plotted on an HSI color space including hue, saturation and intensity using the color information. Those indicated by "•" in FIG. 4 are plotted based on the color information of each pixel. FIG. 4 shows an HSI color space and the hue axis is taken in the circumferential direction in the plane of the paper, the saturation axis is taken in the radial direction, and the intensity axis is taken in the direction perpendicular to the plane of the paper. In FIG. 4, for example, a hue distribution is such that in which the hue of each pixel obtained from a color image is distributed in the region of magenta. Using this generated hue distribution, a mode value of the hue is detected. As a mode value of the hue, the hue in the region of the pixels plotted in the largest number is detected of the hue distribution of all of the pixels distributed in the region of each color. In the hue distribution shown in FIG. 4, the hue of the pixel indicated by "Δ" is the mode value of the hue in the hue distribution.

3) Setting Processing of Target Range

Figure 5:
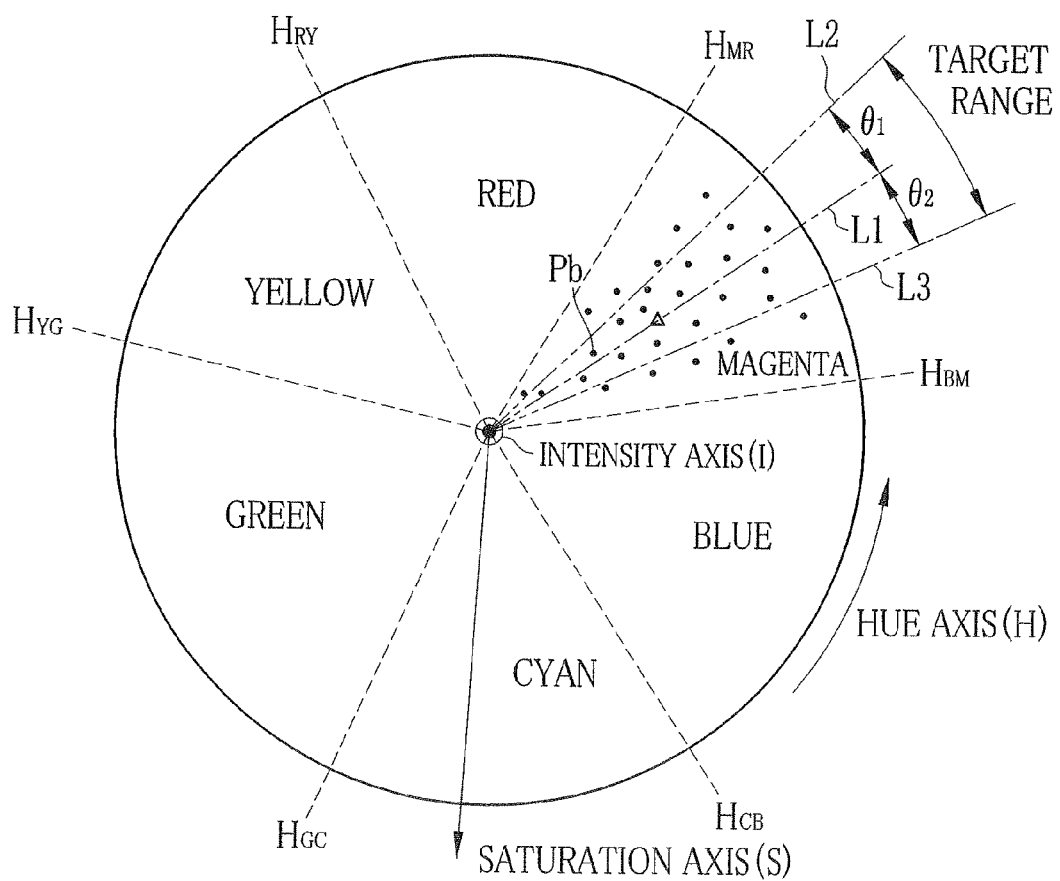
FIG. 5 is a diagram showing plotted hues and a target range.

As shown in FIG. 5, when the mode value of the hue is detected, a straight line that connects the intensity axis and the mode value of the hue is taken as a reference line L1. Then, a line L2 rotated by an angle $\theta_1$ in the counterclockwise direction from the reference line L1 and a line L3 rotated by an angle $\theta_2$ in the clockwise direction from the reference line L1 are found and a range sandwiched by the straight line L2 and the straight line L3 is set as a target range. The target range is, for example, a range of the hue of cells to be observed among stained cells in the color image 20. The angle $\theta_1$ may be the same as or different from the angle $\theta_2$, and these angles are set based on the researches and pathological diagnoses in the past.

4) Conversion Processing of Color Information

As described above, the target range is a range of the hue of the cells to be observed, and therefore, it is only required to change the hue of pixels included in the target range as to be described later, however, when the hue of the pixels included in the target range is changed, there may be a case where the changed hue of the pixels is the same as the hue of pixels not included in the target range, that is, no hue difference will appear. If no hue difference appears, there is a possibility that different elements may be erroneously recognized to be identical in the color image the hue of which has been changed. Because of this, before the hue included in the target range is changed, the color information of pixels having hue out of the target range is converted. Methods of converting color information may include the following.

The color information of each pixel of the color image 20 includes information indicative of a chromatic color. The conversion processing of the color information converts the color information of pixels having hue not included in the target range (range within the angle $\theta_1+\theta_2$, sandwiched by the straight line L2 and the straight line L3) into color information indicative of an achromatic color. In more detail, zero is substituted for the component of saturation of the color information of the pixels having hue not included in the target range. Due to this, only the cells to be observed have a chromatic color and other regions have an achromatic color in the color image. Due to this, in the color image after the image processing, regions other than the cells to be observed are displayed by an achromatic color and it is possible to make an observation while focusing on the cells to be observed. Further, the configuration in the color image is not changed, and therefore, it is also possible to observe the configuration of the entire color image. When pixels having color information indicative of an achromatic color is included as pixels of the color image, it is not necessary to perform the conversion process on color information for these pixels.

5) Change Processing of Hue

Figure 7:
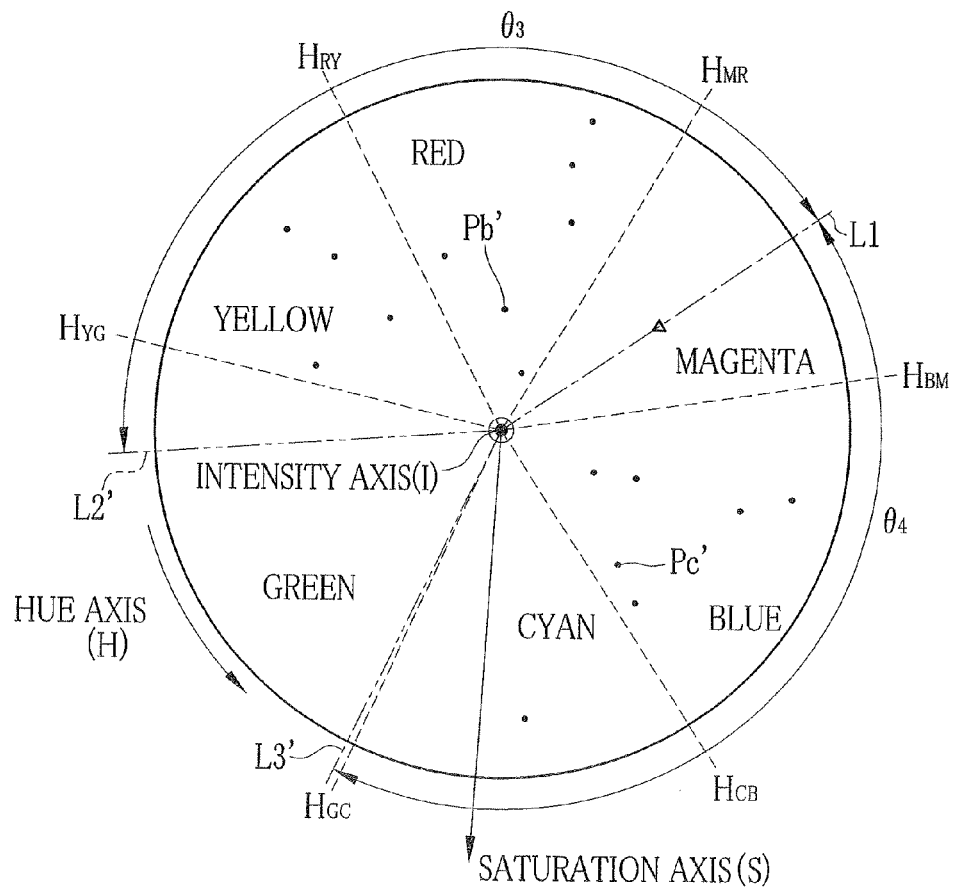
FIG. 7 is a diagram showing the hues after the target range is extended based on a reference line L1.

This is processing to change the hue of each pixel plotted on a color space. As described above, as a target range, a range of the angle ($\theta_1+\theta_2$) sandwiched by the straight line L2 and the straight line L3 is set. In order to change the hue, the range of the angle $a\theta_1$ sandwiched by the reference line L1 and the straight line L2 is virtually extended to the range of the angle $\theta_3$ sandwiched by the reference line L1 and the straight line L2' and the range of the angle $\theta_2$ sandwiched by the reference line L1 and the straight line L3 is virtually extended to the range of the angle $\theta_4$ sandwiched by the reference line L1 and the straight line L3' (refer to FIG. 7).

Figure 6:
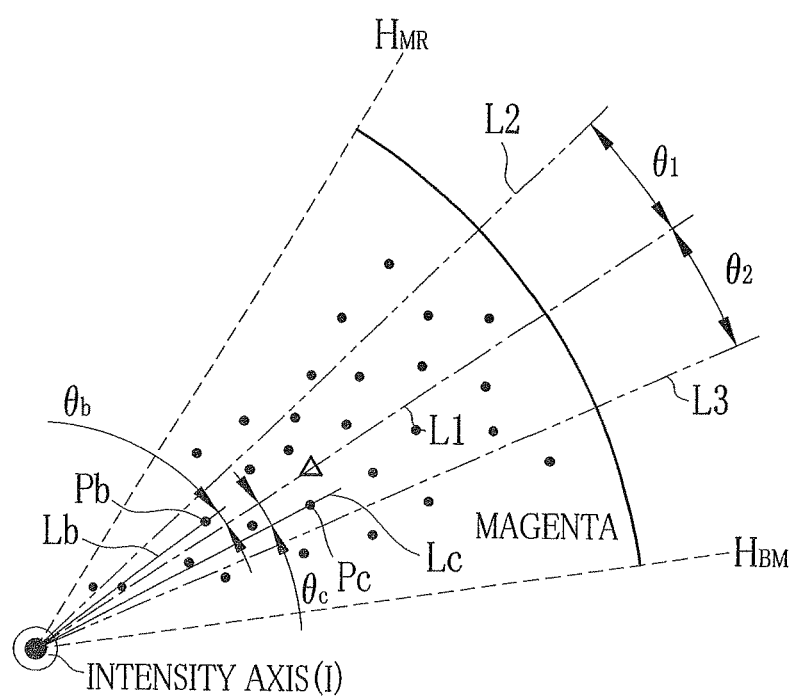
FIG. 6 is an explanatory diagram when the hues included in the target range are changed.

When the target range is extended, for example, the hue in the range of the angle $\theta_1$ sandwiched by the reference line L1 and the straight line L2 is changed by a method shown below. As shown in FIG. 6, a straight line that connects a point Pb indicative of hue included in the range between the reference line L1 and the straight line L2 and the intensity axis is shown as a straight line Lb and an angle formed by the straight line Lb and the reference line L1 is shown as an angle $\theta_b$. As described above, the range of the angle $\theta_1$ sandwiched by the reference line L1 and the straight line L2 is virtually extended to the range of the angle $\theta_3$ sandwiched by the reference line L1 and the straight line L2', and therefore, the straight line Lb that connects the point Pb indicative of the hue and the intensity axis is rotated to a position multiplied by a factor of $\theta_3/\theta_1$ in the counterclockwise direction, that is, to a position of $\theta_3/\theta_1 \times \theta_b^\circ$ in the counterclockwise direction from the reference line L1. That is, the point Pb is rotated to a point Pb' shown in FIG. 7. By this rotation, when the point Pb is hue indicative of, for example, magenta, the hue is changed to red. Because the range of the angle $\theta_3$ in the counterclockwise direction from the reference line L1 includes a boundary $H_{MR}$ between magenta and red, a boundary $H_{RY}$ between red and yellow, and a $H_{GY}$ between yellow and green, the hue of pixels to be plotted in the range of the angle $\theta_1$ sandwiched by the reference line L1 and the straight line L2 is changed to any of the hues of magenta, red, yellow and green.

Similarly, the hue included in the range of the angle $\theta_2$ sandwiched by the reference line L1 and the straight line L3 is changed by a method shown below. As shown in FIG. 6, a straight line that connects a point Pc indicative of hue included in the range between the reference line L1 and the straight line L3 and the intensity axis is shown as a straight line Lc and an angle formed by the straight line Lc and the reference line Ls is shown as an angle $\theta_c$. As described above, the range of the angle $\theta_2$ sandwiched by the reference line L1 and the straight line L3 is virtually extended to the range of the angle $\theta_4$ sandwiched by the reference line L1 and a straight line L3', and therefore, the straight line Lc that connects the point Pc indicative of the hue and the intensity axis is rotated to a position multiplied by a factor of $\theta_4/\theta_2$ in the counterclockwise direction, that is, to a position of $\theta_4/\theta_2 \times \theta_c^\circ$ in the counterclockwise direction from the reference line L1. In other words, the point Pc is rotated to a point Pc' shown in FIG. 7. By this rotation, when the point Pc is hue indicative of, for example, magenta, the hue is changed to blue. Because the range of the angle $\theta_4$ in the clockwise direction from the reference line L1 includes a boundary $H_{BM}$ between magenta and blue, a boundary $H_{CB}$ between blue and cyan, and a boundary $H_{GC}$ between cyan and green, the hue of the pixels to be plotted in the range of the angle $\theta_1$ sandwiched by the reference line L1 and the straight line L2 is changed to any of the hues of magenta, blue, cyan and green.

The above-described angle $\theta_3$ and the angle $\theta_4$ may be the same or different from each other, and the angle $\theta_3$ and the angle $\theta_4$ are set to those so that all of the hues are not included in the extended target range. That is, when these angles are set to those so that all of the hues are included in the extended target range, the hue difference that has occurred before the extension will disappear. That is, it is recommended to set the angle $\theta_3$ and the angle $\theta_4$ so as to be between a minimum angle and a maximum angle, where the minimum angle is an angle in which a boundary between two hues is included and the maximum angle is an angle with which all of the hues are not included in the target range to which the total of the angle $\theta_3$ and the angle $\theta_4$ is extended.

The angle $\theta_3$ and the angle $\theta_4$ may be those which are automatically set or set by the input operation by a user. When these angles are set by the input operation by a user, it will be convenient if design is made so that these angles can be set again because if the angle $\theta_3$ and the angle $\theta_4$ set once are too small (that is, when the color difference does not appear so explicitly), these angle $\theta_3$ and the angle $\theta_4$ can be set again.

6) HSI to RGB Conversion Processing

Figure 8:
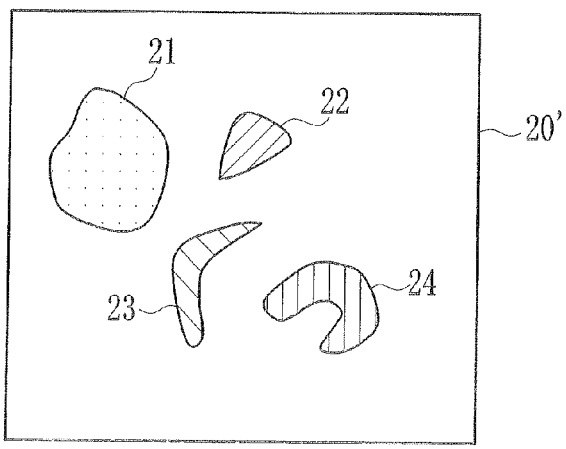
FIG. 8 is an explanatory diagram showing an example of a color image the hues of which have been changed.

The HSI to RGB conversion processing converts the color information including the hue, saturation and intensity of each pixel the hue of which has been converted into color information including the component value of each color of red (R), green (G) and blue (B). Due to this, the color image 20 is converted into a color image 20' in which the hue in the target region has been changed and regions other than the target region have been converted into an achromatic color. The color image 20' of the specimen for which the conversion processing has been performed is output to the display device 14. Due to this, as shown in FIG. 8, on the display device 14, a color image is displayed, in which the hue difference of the cells to be observed is made clear. In FIG. 8, different cells are hatched differently in order to show a case where each cell is displayed in a different hue, however, depending on, for example, the state of the cell, the part of nuclear has the same hue and the hue of the cytoplasm may differ, and in this case, it is possible to visually grasp the state of the cell by the hue.

Next, the flow of the image processing will be described based on the flowchart shown in FIG. 9. Step S101 is processing to take in a color image of a specimen, that is, input processing of an image. When the input processing of an image in step S101 is completed, the operation proceeds to step S102.

Step S102 is RGB to HSI conversion processing. The RGB to HSI conversion processing converts the color information of each pixel of a color image from each color component of R G B to each component of HSI.

Step S103 is processing to detect a mode value of the hue. The execution of the processing in step S102 converts the color information of each pixel of the color image from each color component R, G, B to each component H, S, I. Using each component H, S, I, each pixel is plotted in the above-described color space. By plotting all of the pixels of the color image in the color space, the hue distribution for all of the pixels can be obtained. From this obtained hue distribution, the hue in the region where the number of plots is the largest is detected as the mode value of the hue. In FIG. 4, because the largest number of pixels is distributed in the region of magenta, the hue indicated by "Δ" in FIG. 4 is detected as the mode value of the hue. When the processing in step S103 is completed, the operation proceeds to step S104.

Step S104 is processing to set a target range. The execution of the processing in step S103 obtains the hue distribution in the color image and detects the mode value of the hue. The processing in step S104 sets a straight line that connects the detected mode value of the hue and the intensity axis as the reference line L1. As shown in FIG. 5, the straight line L2 that is rotated by the angle $\theta_1$ in the counterclockwise direction with respect to the reference line L1 and the straight line L3 that is rotated by the angle $\theta_2$ in the clockwise direction are found and the range sandwiched by the straight line L2 and the straight line L3 is set as the target range. For example, when the angle $\theta_1$ and the angle $\theta_2$ are set to 10°, respectively, the range of 20° will be the target range.

Step S105 is processing to convert color information of pixels having hue not included in the target range. In more detail, the processing converts color information of pixels having hue in the target range into color information of an achromatic color. The color information of each pixel of a color image is color information indicative of a chromatic color regardless whether or not included in the target range. The processing in step S105 converts, by replacing the component of the saturation with zero in the color information of pixels, which hue is not included in the target range, the color information of pixels, which hue is not included in the target range, into color information indicative of an achromatic color. Due to this, only the color information of pixels included in the target range will be the color information indicative of a chromatic color.

Step S106 is processing to change the hue. Because the target range is set in step S104, the hue of pixels included in the target range is changed by extending the set target range. As described above, the target range includes the range sandwiched by the reference line L1 and the straight line L2 rotated by the angle $\theta_1$ in the counterclockwise direction with respect to the reference line L1, and the range sandwiched by the reference line L1 and the straight line L3 rotated by the angle $\theta_2$ in the clockwise direction with respect to the reference line L1. Because of this, when the target range is extended, the range of the angle $\theta_1$ sandwiched by the reference line L1 and the straight line L2 is extended to the range of the angle $\theta_3$ sandwiched by the reference line L1 and the straight line L2' and the range of the angle $\theta_2$ sandwiched by the reference line L1 and the straight line L3 is extended to the range of the angle $\theta_4$ sandwiched by the reference line L1 and the straight line L3', respectively (refer to FIG. 7). Due to this extension of the target range, the hue included in the target range is changed.

For example, a case where the hue included in the target range is in the position indicated by the point Pb, as shown in FIG. 6, will be described. When the angle formed by the straight line Lb connecting the point Pb and the intensity axis and the reference line L1 is the angle $\theta_b$, by the extension of the target range described above, the straight line Lb is rotated from the reference line L1 to the position of the angle $\theta_3/\theta_1 \times \theta_b$ in the counterclockwise direction. That is, the hue indicated by the point Pb is changed to the hue indicated by the point Pb'. In this manner, the hues (H) of the pixels plotted in the range between the reference line L1 and straight line L2 are changed, respectively, however, the hues included in the range between the reference line L1 and the straight line L2 rotated by the angle $\theta_1$ in the counterclockwise direction with respect to the reference line L1 are rotated by the same factor of multiplication, respectively, and therefore, it is possible to make large the difference in the hue of each pixel in a state where the correlation between hues is maintained.

The above also applies similarly when the hue included in the target range is in the position indicated by the point Pc. When the angle formed by the straight line Lc connecting the point Pc and the intensity axis and the reference line L1 is the angle $\theta_c$, by the extension of the target range described above, the straight line Lc is rotated from the reference line L1 to the position of the angle $\theta_4/\theta_2 \times \theta_c$ in the clockwise direction. That is, the hue indicated by the point Pc is changed to the hue indicated by the point Pc'. In this manner, the hues of the pixels plotted in the range between the reference line L1 and straight line L3 are changed, respectively. In this case also, the hues included in the range between the reference line L1 and the straight line L3 rotated by the angle $\theta_2$ in the counterclockwise direction with respect to the reference line L1 are rotated by the same factor of multiplication, respectively, and therefore, it is possible to make large the difference in the hue of each pixel in a state where the correlation between hues is maintained.

Step S107 is HSI to RGB conversion processing. The processing converts color information of each pixel of the color image the hue of which has been converted in step S106 into the component of each color R, G, B from each component of the hue, saturation and intensity. Due to this, a color image the hue of which has been changed is obtained. This color image is displayed on the display device 14. On the display device 14, the color image is displayed in which the cells to be observed are displayed classified into a plurality of hues and, at the same time, the cells other than the cells to be observed are displayed in achromatic color. That is, the cells to be observed are displayed in a chromatic color and the subtle difference between cells is explicitly displayed as a hue difference, and therefore, it is possible to easily recognize the subtle difference between cells visually. Further, those other than the cells to be observed are displayed in an achromatic color, and therefore, it is possible to focus on the cells to be observed and it is made possible to keep a state where the configuration in the color image is maintained. Because those other than the cells to be observed displayed in an achromatic color appear bright or dark depending on the intensity value, it is possible to produce a display without destroying information in the color image.

Figure 10:
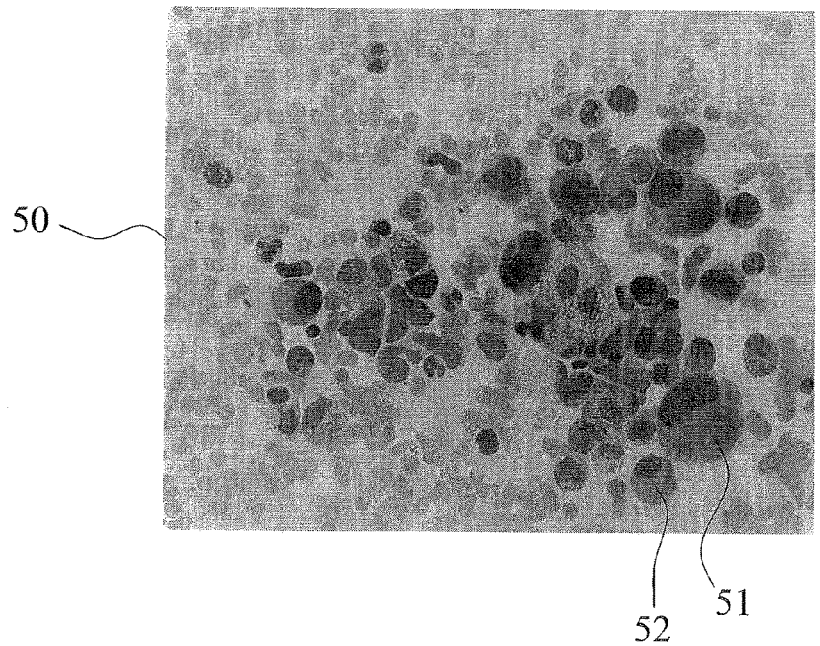
FIG. 10 is a diagram showing an example of an image of Giemsa-stained cell of smear of bone marrow aspirate.
Figure 11:
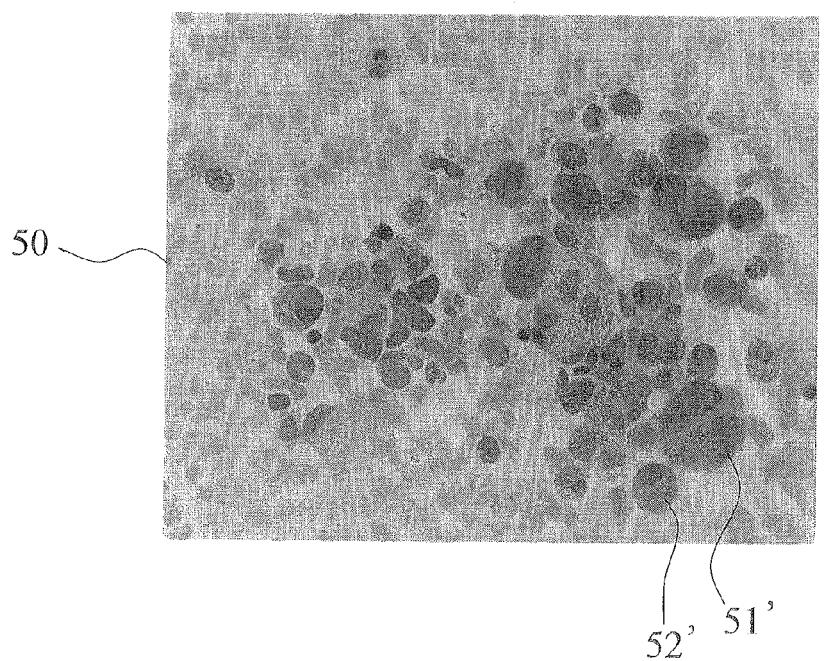
FIG. 11 a diagram showing an example of an image of the cell after the hues of the image in FIG. 10 have been changed.

FIG. 10 shows an image of Giemsa-stained cells of smear of bone marrow aspirate collected from bone marrow of a patient with mast cell leukemia. In an image 50 shown in FIG. 10, reference number 51 denotes a structure that appears in the cytoplasm of the promyelocyte and reference number 52 denotes a structure that appears in the cytoplasm of mylocyte. These structures 50, 51 are recognized as, for example, a set of purple granulocytes that are stained into substantially the same basophilic granulocytes, and therefore, it is difficult to distinguish between the structures from the image 50. If processing using the technique is performed for the image 50 as shown in FIG. 11, the structure 51 changes to a structure (reference number 51' in the figure) including red granulocytes and the structure 52 changes to a structure (reference number 52' in the figure) including green granulocytes, and therefore, it is made possible to distinguish between the structures from the difference in the hue between the structures that appear in the cytoplasm.

In the present embodiment, after the color information of pixels having hue outside the target range is converted into color information indicative of an achromatic color, the processing to change the hue included in the target range is performed, however, this does not need to be limited and it is also possible to convert the color information of pixels having hue not included in the target range into the color information of single hue when changing the hue in the target range. In this case, the configuration of the image processing device and the flow of the image processing are the same as the configuration in FIG. 3 shown in the present embodiment, however, the content of the conversion processing of color information shown by reference number 34 in FIG. 3 and the content of the processing in step S105 in FIG. 9 are different. That is, rather than that the color information of pixels having hue not included in the target range is converted into the color information indicative of an achromatic color, the color information is converted into the color information of single hue different from the hue included in the target range to be extended when the hues are changed. As described above, the target range is extended in such a manner that the hues included in the target range after the extension are not all of the hues based on the mode value of the hue (H). For example, in FIG. 7, when the target range is extended to the range of the angle θ₁ + angle θ₂ sandwiched by the straight line L2' and the straight line L3', it is only required to convert the color information of pixels having hue not included in the target range (hue not existing in the range sandwiched by the straight line L2 and the straight line L3 shown in FIG. 5) into the color information of a single hue included in the range of the angle $(360-(\theta_3+\theta_4))°$.

In the present embodiment, by changing the hue included in the target range, the hue difference of the cells to be observed is made large, however, depending on an object to be observed, for example, there may be a case where the saturation of pixels having hue included in the target range is small, and therefore, it is not possible to visually observe the subtle difference between cells to be observed only by making large the hue difference. When this is the case, it is possible to change the saturation as well as changing the hue of the pixels plotted in the target range.

For example, because the color information of each pixel is converted from each color component red (R), green (G), and blue (B) into the components of the hue (H), saturation (S), and intensity (I), the value of the saturation of each pixel is known in advance. In this case, a threshold value (reference value) that serves as a reference used to change the saturation in advance is set in advance. Then, after finding the maximum value of the saturation of pixels having hue included in the target range to be set, it is only required to compare the above-described threshold value with the maximum value and change the value of the saturation when changing the hue if the maximum value is not more than the threshold value or the minimum value is not less than the threshold value. As the change of the saturation, it can be conceived to multiply the saturation by a factor of n. For example, when the maximum value of the saturation in all of the pixels is not more than the threshold value, n>1 is set. In this case, there is a possibility that the value of the saturation is saturated, and therefore, it is required, for example, to set a factor of multiplication of saturation so that the saturation of pixels having hue included in the target range is not saturated. When the minimum value of the saturation is not less than the threshold value, n<1, and in this case, it is required to set so that the maximum value of the saturation is not less than or equal to the threshold value.

In the present embodiment, the hue included in the target range is changed by extending the target range to be set based on the mode value of the hue, however, depending on the position of the target range to be set, for example, there is a case where the difference in the changed hue hardly appears only by the extension of the target range. In this case, it is also possible to extend the target range after rotating the hue distribution to be plotted on a color space by a predetermined amount around the intensity axis after setting the target range.

Figure 9:
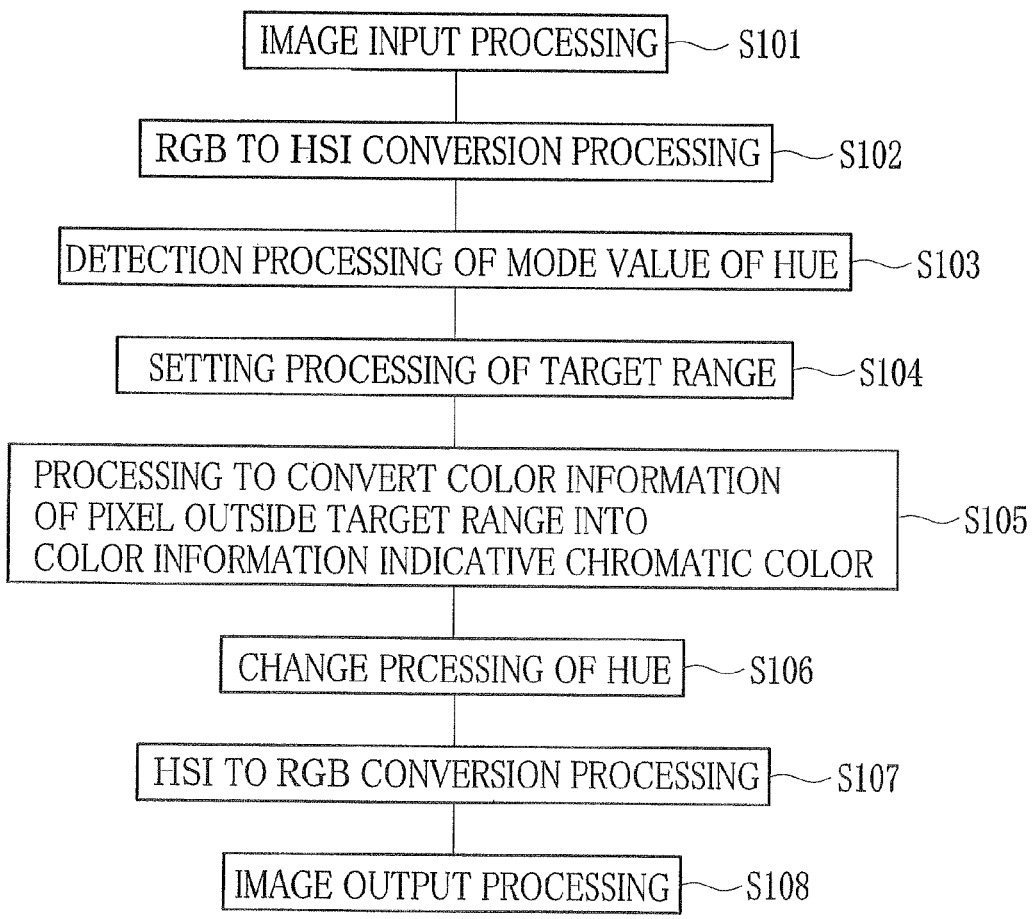
FIG. 9 is a flowchart showing a flow of image processing in an image processing device.

In the present embodiment, the image processing device is described, however, this is not limited and there may be an image processing program capable of causing a computer to execute the processing shown in FIG. 3 and the processing shown in the flowchart in FIG. 9. Further, it is preferable for the image processing program that causes a computer to execute the processing shown in FIG. 3 and the processing shown in the flowchart in FIG. 9 to be stored in a recording medium, such as a memory card, a magnetic disc, and an optical disc, that can be read by a computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing device, comprising:
    a color information obtaining part obtaining at least a hue from color information of each pixel of a color image of a stained specimen;
    a detecting part detecting, from a hue distribution determined by plotting a hue of each pixel of the color image on a plane represented by a hue and saturation of a color space defined by the hue, saturation and intensity, a mode value of the hue and a hue area on the plane to which the hue distribution belongs;
    a range setting part setting, based on a most plotted area on the plane within the hue area to which the hue distribution belongs, a first straight line at a position rotated centering around an intensity axis by a first angle in a counterclockwise direction with respect to a reference line and a second straight line at a position rotated centering around the intensity axis by a second angle in a clockwise direction with respect to the reference line, the reference line connecting the mode value of the hue and the intensity axis, and setting a target range for a hue of cells to be observed among a plurality of stained cells of the stained specimen to include the mode value of the hue positioned between the first and second straight lines;

a changing part changing color information of a pixel having a hue and being included in the target range by extending a hue distribution included in the target range to other hue area and extending the target range to not to include all hues on the plane in the target range by rotating the first straight line in the counterclockwise direction centering around the intensity axis with respect to the reference line and rotating the second straight line in the clockwise direction centering around the intensity axis with respect to the reference line; and an information converting part converting color information of a pixel having at least one hue not included in the target range into color information having a hue outside the extended target range.

2. The image processing device according to claim 1, wherein the information converting part converts color information of a pixel having at least one hue not included in the target range into either color information indicative of an achromatic color or color information of a single hue outside the extended target range.

3. The image processing device according to claim 1, wherein:

the color information obtaining part determines saturation of each pixel of the color image, in addition to the hue; and the detecting part determines the mode value of the hue by developing the hue and the saturation of each pixel of the color image on the plane represented by the hue and the saturation.

4. The image processing device according to claim 1, wherein the changing part changes the saturation and the hue included in the target range.

5. The image processing device of claim 1, wherein the mode value corresponds to a largest hue in a distribution of pixels.

6. The image processing device according to claim 1, wherein the changing part is configured to perform the extension on the target range in connection with first and second angles in clockwise and counterclockwise directions of the color space, respectively, the first angle being different from the second angle.

7. A non-transitory computer-readable medium storing an image processing program causing a computer to execute:

a color information obtaining operation of obtaining at least a hue from color information of each pixel of a color image of a stained specimen;

a detecting operation of detecting, from a hue distribution determined by plotting a hue of each pixel of the color image on a plane represented by a hue and saturation of a color space defined by the hue, saturation and intensity, a mode value of the hue and a hue area on the plane to which the hue distribution belongs;

a range setting operation of setting, based on a most plotted area on the plane within the hue area to which the hue distribution belongs, a first straight line at a position rotated centering around an intensity axis by a first angle in a counterclockwise direction with respect to a reference line and a second straight line at a position rotated centering around the intensity axis by a second angle in a clockwise direction with respect to the reference line, the reference line connecting the mode value of the hue and the intensity axis, and setting a target range for a hue of cells to be observed among a plurality of stained cells of the stained specimen to include the mode value of the hue positioned between the first and second straight lines;

a changing operation of changing color information of a pixel having a hue and being included in the target range by extending a hue distribution included in the target range to other hue area and extending the target range to not to include all hues on the plane in the target range by rotating the first straight line in the counterclockwise direction centering around the intensity axis with respect to the reference line and rotating the second straight line in the clockwise direction centering around the intensity axis with respect to the reference line; and an information converting operation of converting color information of a pixel having at least one hue not included in the target range into color information having a hue outside the extended target range.

8. The non-transitory computer-readable medium of claim 7, wherein the mode value corresponds to a largest hue in a distribution of pixels.

* * * * *